United States Patent [19]
Wood et al.

[11] 3,889,417

[45]* June 17, 1975

[54] METHOD FOR PREPARING HORTICULTURAL FOAM STRUCTURES

[75] Inventors: Louis Leonard Wood, Rockville, Md.; Kurt Charles Frisch, Grosse Ile, Mich.

[73] Assignee: W. R. Grace & Co., New York, N.Y.

[ * ] Notice: The portion of the term of this patent subsequent to May 28, 1991, has been disclaimed.

[22] Filed: May 16, 1974

[21] Appl. No.: 470,492

Related U.S. Application Data

[63] Continuation-in-part of Ser. No. 279,403, Aug. 10, 1972, Pat. No. 3,812,619, which is a continuation-in-part of Ser. No. 250,012, May 3, 1972, abandoned.

[52] U.S. Cl. .................. 47/58; 260/2.5; 47/56; 47/9
[51] Int. Cl. ............................................. A01g 9/10
[58] Field of Search ...... 260/2.5; 47/56, 37, DIG. 7, 47/9, 58; 71/1

[56] References Cited
UNITED STATES PATENTS

| | | | |
|---|---|---|---|
| 3,257,754 | 6/1966 | Ohsol | 47/56 |
| 3,703,786 | 11/1972 | Swan | 47/56 |
| 3,812,618 | 5/1974 | Wood et al. | 47/56 |

*Primary Examiner*—Robert E. Bagwill
*Attorney, Agent, or Firm*—Eugene M. Bond

[57] ABSTRACT

The invention disclosed provides a method for preparing horticultural foam structures. A foam sheet prepared by reacting an isocyanate capped polyoxyethylene polyol reactant with large amounts of an aqueous reactant is used as a carrier for pesticides, herbicides, seeds or the like. Desirably, the foam sheet further includes a support material for the foam sheet, the resultant composite foam structure provides an effective means for protecting dormant seeds, for sustaining seed germination plant growth, or optionally for controlled release of pesticides and/or herbicides.

21 Claims, 3 Drawing Figures

METHOD FOR PREPARING HORTICULTURAL FOAM STRUCTURES

This application for U.S. Patent is a continuation-in-part of application Ser. No. 279,403, filed Aug. 10, 1972, now U.S. Pat. No. 3,812,619, which in turn is a continuation-in-part of application Ser. No. 250,012, filed May 3, 1972, now abandoned.

This invention relates to horticultural foam structures using hydrophilic crosslinked polyurethane foams as a carrier. More particularly, the present invention relates to horticultural foam structures prepared from a capped polyoxyethylene polyol reactant which is then admixed with large amounts of an aqueous reactant. The aqueous reactant may contain seeds or optionally materials such as pesticides and/or herbicides as desired. The generated foams may be disposed relative a support material. Seeds may be applied to the foam surface during foaming or by adhesive thereafter. In either regard, an effective means for protecting dormant seeds, as well as for sustaining seed germination and plant growth is provided.

It is well known in the art that artificial structures such as glass wool, fabrics and the like may be used as a means for germination of seeds. In such structures, seeds are laminated within the structure along with layers of plant growth materials (U.S. Pat. No. 1,971,504) or otherwise the seeds are adhered to the under-surface of the structure by using an adhesive or the like (U.S. Pat. No. 3,557,491). Although these prior art structures are useful, they nevertheless are relatively costly to prepare and have thus received limited commercial acceptance. It has now been found, however, that by the present invention there is provided a simple efficient means of forming a horticultural foam structure which may either contain or support seeds or the like, or optionally materials such as herbicides or pesticides. Thus, an aqueous reactant and resin reactant are simply and uniformly foamed. The resultant foam structures are found to provide an effective means for protecting dormant seeds, for sustaining seed germination and plant growth, or for controllably releasing herbicides or pesticides.

It is also well known that numerous attempts have been made in the prior art to produce hydrophilic polyurethane foams. Typically, these attempts have been based on inclusion of a separate hydrophilic additive into a hydrophobic polyisocyanate either during or after foaming; preparation of foams using reactants such as polyoxyethylene polyol, polyisocyanate with low, i.e., near stoichiometric amounts of water, and a catalyst; and foams based on non-catalytic reactions using linear polyoxyethylene diols, diisocyanate and varying amounts of water. Such foams, either by inclusion of materials necessary for foam generation or because of the criticality of the reaction have not provided useful structures for horticultural purposes. However, it has been found that polyurethane foams may be effectively prepared simply by reacting a particular isocyanate capped polyoxyethylene polyol with large controlled amounts of an aqueous reactant. The aqueous reactant may contain seeds or the like with optional materials as desired. Alternatively, the seeds or the like may be applied to a surface of the foam. Herbicides or pesticides may be included in the aqueous reactant if desired separate of seeds. The generated foams are typically characterized by having a crosslinked, i.e., non-linear, molecular network which provides a useful means for seed transport, germination and plant growth; or optionally as a means for controllably releasing a pesticide or herbicide.

Generally stated, the present crosslinked hydrophilic foam may be prepared by capping polyoxyethylene polyol with a polyisocyanate such that the capped product has a reaction functionality greater than two. The capped product is foamed simply by combining it with an aqueous reactant possibly containing an additive such as seeds, herbicide or pesticide. Optionally, the capped product and/or aqueous reactant may contain a suitable crosslinking agent, if desired, in which case the capped polyoxyethylene polyol product may have a functionality approximating 2. The foaming reaction may be initiated and thereafter the seeds are disposed on the foam. A fabric backing may be attached to the foam layer.

Practice of the present invention will become more apparent from the following detailed description taken in conjunction with the drawings wherein.

Figure 1:
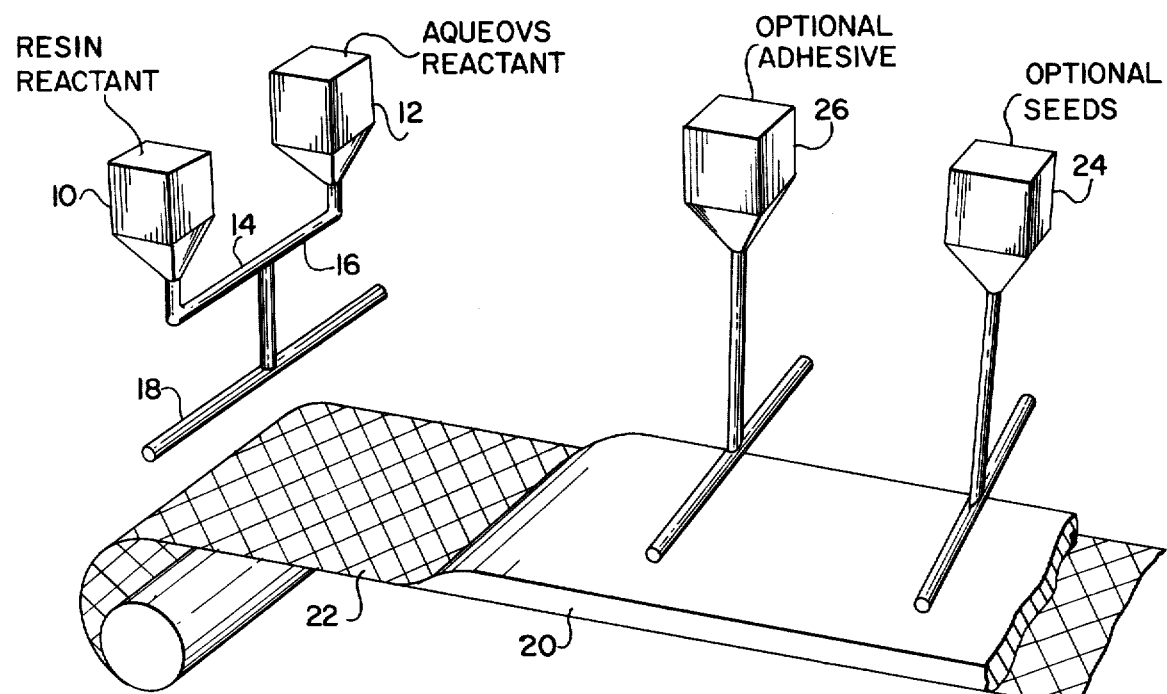
FIG. 1 illustrates a general diagrammatical view of the present method.

In the drawings wherein similar elements are identified using similar numerals throughout the several views, FIG. 1 generally illustrates resin reactant container 10, and aqueous reactant container 12 joined respectively by lines 14 and 16 to provide a reactant mixture via line 18. The foaming mass 20 is disposed on a support layer 22 which may be a composite portion of the foam structure. Alternatively, the foamed mass 20 may be removed from the support layer and used without backing if desired. Subsequently, alternate backings may be applied by any convenient means as desired.

It is also possible to prepare seed-foam-fabric composites using conventional moving dual belt flexible foam laminator machines. In this technique the foaming mixture comprising resin reactant, aqueous reactant and, optionally, seeds (seeds may be applied later by use of adhesives, and the like, if desired) is metered onto the bottom belt just prior to entry into the nip of a dual roller system which controls the foam layer thickness. The foam sheet or laminate exiting the machine is then dried and roller upon spools for storage prior to use.

It is also feasible in order to reduce cost of the seed-foam-fabric composite to apply the foam to the fabric substrate in a discontinuous fashion as follows. The foam is prepared in sheet form to desired thickness, and then sliced into discrete strips or small blocks (e.g., blocks 1 inch × 1 inch × 0.125 inch, etc.). The strips or blocks are then affixed using adhesives, etc. to a scrim fabric such as tobacco cloth. Disposement of the foam may be uniform or random but preferably in a pattern that on the average will permit an average of one to two seeds or more per square inch of surface area of the substrate seed-foam-fabric composite. Seeds can be put into the foam prior to or during the foaming reaction or may be adhesively bonded to the foam surface in a subsequent operation. The net result is a fabric which is discontinuously covered with foam-seed segments thereby utilizing less foam overall and providing a reduction in product cost, weight, volume, etc.

The fabric used as the support layer is desirably inexpensive and biodegradable. The fabric, either woven or non-woven, may be paper, plastic, cloth or the like as desired. Cheese cloth or tabacco cloth is found to be preferred since it is biodegradable and inexpensive to prepare.

In one embodiment, seeds are disposed within the aqueous reactant 12 prior to foaming. In another embodiment, the seeds are applied to the surface of the foaming mass to which they readily adhere. It is also possible to apply seeds subsequently to foaming using a convenient adhesive as desired.

The seeds and foam may be stored for long periods of time without danger of germination. However, case must be taken not to expose the packet to the direct action of water and sunlight. When the growing season arrives, the seeds are then placed in an environment conducive to germination, i.e., exposed to water and sunlight or other ultraviolet radiation sources. The seeds-foam composite may be applied directly to soil or the seeds may be first permitted to grow in the foam substrate and then applied later to the soil as a pre-grown plant section.

Seeds usefully employed herein may be of most any type, including bulbs or the like, plants, grass, shrubs and small trees as desired without limitation.

The addition to the foaming composition of an enriching agent or fertilizer or other medium capable of providing the necessary nutrients to the seed during the period of growth is desirable. Suitable fertilizers would include nitrogen, potassium, potash and magnesium.

In addition, insecticides, fungicides, nemacides, enzymes, hormones or the like in any desired combination which will assist in the germination of the seed and growth and protection of the plant may be included in the foaming reaction by means of the aqueous reactant or the resin reactant.

By providing all essential ingredients in a single unit, not only is planting technique simplified, but growth is stimulated.

The amount of the various components, including seeds, will depend on the type of seed and soil or other germinating conditions. Sufficient vermiculite or the like may be employed to help to retain moisture or other horticultural additives. Sufficient fertilizer or the like is employed to provide the proper growth and rate of growth for the seed used. The fertilizer may be a slow-release fertilizer such as magnesium ammonium phosphate which releases its nutrients at about the rate necessary for good growth instead of dissolving all at once.

When the seeds are separately applied, they may be applied such as by optional seed applicator 24 following application of adhesive from adhesive applicator 26.

Figure 3:
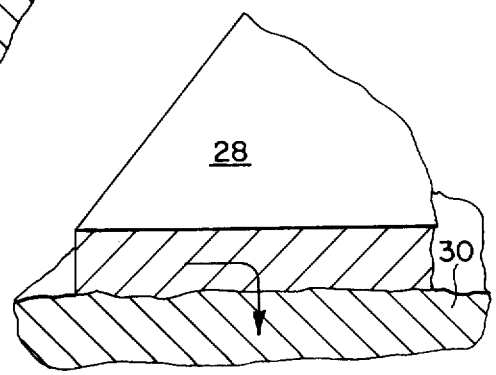
FIG. 3 is a portion of an embodiment of the present foam when used as a means for releasing herbicides or pesticides.

In an embodiment, herbicides and/or pesticides are included within the aqueous reactant such that the foam contains these materials. In use, FIG. 3, the pesticides or herbicides within foam 28 will slowly leach into the soil 30.

Figure 2:
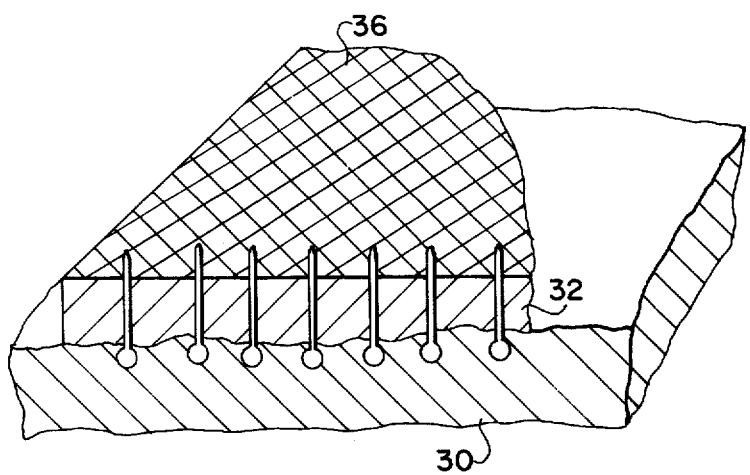
FIG. 2 is a portion of an embodiment of the present seed-foam-fabric composite taken as a partial top elevational view.

In the embodiment of FIG. 2, foam 32 on soil 30 has seeds 34 affixed to the underside of the foam intermediate the foam and soil to protect them from erosion, bird pilferage, etc. The seeds may then grow through the foam and the support layer 36.

Crosslinked hydrophilic foam useful herein may be prepared by capping polyoxyethylene polyol with a polyisocyanate such that the capped product has a reaction functionality greater than two.

Polyoxyethylene polyol is terminated or capped by reaction with a polyisocyanate under an inert moisture-free atmosphere using for example a nitrogen blanket, at atmospheric pressure and at a temperature in the range of from about 0°C. to about 120°C. for a period of time of about 20 hours depending upon the temperature and degree of agitation. This reaction may also be effected under atmospheric conditions provided the product is not exposed to excess moisture. The polyisocyanates used for capping the polyoxyethylene polyol include polyisothiocyanates and polyisocyanates such as PAPI (polyaryl polyisocyanate as defined in U.S. Pat. No. 2,683,730), tolylene diisocyanate, triphenylmethane-4,4',4'',-triisocyanate, benzene-1,3,5,-triisocyanate, toluene-2,4,6,-triisocyanate, diphenyl-2,4,4,'-triisocyanate, hexamethylene diisocyanate, xylene diisocyanate, chloropheny diisocyanate, diphenylmethane-4,4'-diisocyanate, naphthalene-1,5-diisocyanate, xylene-alpha, alpha'-diisothiocyanate, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylenebis (phenylisocyanate),4,4'-sulfonylbis (phenylisocyanate),4,4'-methylene di-ortho-tolylisocyanate, ethylene diisocyanate, ethylene diisocyanate, ethylene diisothiocyanate, trimethylenediisocyanate, diicyclohexyl methane-4,4'-diisocyanate, isophorone diisocyanate, 1,6-hexamethylene diisocyanate, 2,2,4-trimethyl-1,6-hexane diisocyanate, and the like.

Capping of the polyoxyethylene polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio.

The isocyanate capped polyoxyethylene polyol reaction products are formulated in such a manner as to give crosslinked, three dimensional network polymers on foaming. In order to achieve such infinite network formation on foaming, the reactive components may be formulated in one of the following by way of example. First, when water is the sole reactant with the isocyanate groups leading to chain growth during the foaming process, the isocyanate capped polyoxyethylene polyol reaction product must have an average isocyanate functionality greater than 2 and up to about 6 or 8 or more depending upon the composition of the polyol and capping agent components. Secondly, when the isocyanate capped polyoxyethylene polyol has an isocyanate functionality of only about two, then the water or aqueous reactant used may contain a dissolved or dispersed isocyanate-reactive crosslinking agent having an effective functionality greater than two. In this case, the reactive crosslinking agent is reacted with the capped polyoxyethylene polyol when admixed during and after the foaming process has been initiated. Thirdly, when the isocyanate capped polyoxyethylene polyol has an isocyanate functionality of only about two, then a polyisocyanate crosslinking agent having an isocyanate functionality greater than two may be incorporated therein, either preformed or formed in situ, and the resultant mixture may then be reacted with water or aqueous reactant with seeds, herbicide or pesticide dispersed therein and optionally containing a dissolved or dispersed reactive isocyanate-reactive crosslinking agent, leading to a crosslinked infinite network hydrophilic polyurethane foam.

The presence of a crosslinking agent in the water or aqueous reactant is crucial when the isocyanate capped reaction product has a functionality of only about two and only optional when the functionality thereof is greater than two.

Water soluble or water dispersible crosslinking agents operable in this invention desirably should be polyfunctional and reactive with isocyanate groups and include but are not limited to materials such as diethylenetriamine, triethylenetetramine, tetraethylenepentamine, polyethyleneimine, glycerol, trimethylolpropane, pentaerythritol, tolylene-2,4,6-triamine, ethylene diamine, aminoethanol, trimethylenediamine, tetramethylenediamine, pentamethylenediamine, hexamethylenediamine, ethanolamine, diethanolamine, hydrazine, triethanolamine, benzene-1,2,4-tricarboxylic acid, nitrilotriacetic acid, citric acid, 4,4'-methylenebis(o-chloroaniline), and the like. The water soluble or water dispersible crosslinking agents chosen are those which cause a crosslinked network to form during or after the foaming process begins to take place.

It has also been found that the capped polyoxyethylene polyol having an isocyanate functionality greater than two used to prepare a three dimensional network polymer must be present in an amount sufficient to insure formation of the dimensional network. Thus, amounts of the capped polyoxyethylene polyol having an isocyanate functionality greater than two in the component to be foamed range from about 3% by weight of this component up to 100% by weight. Thus, it is possible to include a capped polyoxyethylene polyol having a terminal member with an isocyanate functionality of two, i.e., a diisocyanate in an amount from 0% by weight up to about 97% by weight of the component to be foamed. The maximum amounts of diisocyanate used are limited to that necessary to permit crosslinking to take place during foaming, as contrasted to formation of a linear polymeric structure, and the properties desired in the finally prepared foam.

It is possible and somethimes desirable to incorporate small amounts of a relatively hydrophobic comonomer into the ethylene oxide based polymerization products. Thus, comonomers such as propylene oxide or butylene oxide may be copolymerized as a random copolymer, block-copolymer, or both, such that the copolymers remain hydrophilic. Up to about 40 mole percent, but desirably about 25 mole percent or less, or the relatively hydrophobic comonomer may be copolymerized with the ethylene oxide monomer and still yield hydrophilic crosslinked network foams when those products are used as polyol intermediates in practicing the present invention. Thus, throughout this text, the term "polyoxyethylene polyol" is intended to include not only homopolymers of ethylene oxide but also hydrophilic copolymers of ethylene oxide such as those described above wherein all of these polyol derivatives have a hydroxyl functionality of about two or greater and an ethylene oxide content ranging from about 60 mole percent to about 100 mole percent, and preferably greater than about 75 mole percent.

To effect foaming and preparation of the crosslinked network polymer, the component including the isocyanate capped polyoxyethylene polyol having a functionality about 2 or greater is simply combined with a particular aqueous component. For simplicity, this isocyanate capped reaction component will herein be referred to as resin reactant.

The aqueous component may appear as water, a water slurry or suspension, a water emulsion, or a water solution having water soluble materials disposed therein. For convenience, the aqueous component is referred to herein as an aqueous reactant.

In contrast to typical polyurethane reactions such as those using catalyst or like promotors where one mole of -NCO is reacted with one half mole water, the present reaction proceeds simply with a large but controlled excess of water, and thus permits foaming while in the presence of seeds, pesticides, herbicides, and, if desired, up to large amounts of nutrients or soil conditioners.

In typical polyurethane reactions known to the art, an excess of water may be used in some formulations to obtain improved properties. This has been observed at page 43 in the publication by Saunders and Frisch entitled "Polyurethanes," published by Interscience Publishers, where it is further observed that if less than stoichiometric amounts of water are used, the foam is more crosslinked, firmer, has lower elongation and higher density. A large excess of water, they observe, will use up the free isocyanate groups, leaving insufficient isocyanate available for effective crosslinking while resulting in the formation of many free amino end groups. As water content increases, the foam density decreases and about 30–50% excess water results in a marked decrease in physical properties.

The dramatic way in which the addition of water influences practice of the present invention is seen by consideration of the Water Index:

$$\frac{\text{equivalents of H}_2\text{O} \times 100}{\text{equivalents of NCO}} = \text{Water Index Value}$$

By noting that in polyurethane foaming reactions one mole of water ultimately consumes two NCO groups, i.e., 1 mole $H_2O$ = 2 equivalents —OH which react with 2 equivalents of NCO, a Water Index Value of 100 will indicate that the equivalents of water and equivalents of isocyanate are balanced. An Index of 95 indicates that there is a 5% shortage of water equivalents while an Index of 105 indicates a 5% surplus of water equivalents. A slight shortage of water equivalents (i.e., a slight excess of isocyanate), usually 3–5%, is common practice in the prior art, particularly with flexible foams.

Using the present resin reactant and water in amounts from about 0.5 mole $H_2O$/mole NCO groups ($H_2O$ Index Value of 100) up to about 2 moles $H_2O$/mole NCO groups ($H_2O$ Index Value of 400) results in poor foaming unless materials such as surfactants and catalysts or the like are included. When using about 6.5 moles $H_2O$ mole/NCO groups ($H_2O$ Index Value of 1300) up to about 390 moles $H_2O$/mole NCO groups, ($H_2O$ Index value 78,000), surprisingly good foams result which improve in characteristics with added amounts of molar water. Thus, the available water content in the aqueous reactant is from about 6.5 to about 390 moles $H_2O$/NCO groups in the resin reactant, i.e., an $H_2O$ Index Value of about 1300 to about 78,000 and desirably from about 4,000 to about 40,000, i.e., about 20 to about 200 moles $H_2O$/NCO groups.

"Available water" in the aqueous reactant is that water accessible for reaction with the resin reactant, and which is exclusive of water which may layer during reaction, or supplemental water which may be necessary because of further water-absorbitive or water-binding components or additives present in forming the aqueous reactant.

The reaction temperature to effect foaming obviously is regulated by the viscosity of the resin reactant. The reaction may proceed either as a batch reaction or as a continuous reaction. Either the resin reactant may be poured into the aqueous reactant, or both may be combined simultaneously such as when using spray or froth application techniques. Both internal metering/mixing spray equipment and external mixing spray equipment can be used as desired. Use of spray equipment is highly desirable since the present foam product is not highly sensitive to accurate metering or mixing of the aqueous and resin reactants.

Conventional foam production, processing and spraying equipment requires the frequent and extensive use of toxic or flammable organic solvents such as acetone, tricresyl phosphate, methylene chloride and the like for cleaning and purging purposes. With the hydrophilic polyurethane components of the present invention, cleaning may be carried our conveniently with simple, non-toxic and non-flammable aqueous solutions. Moreover, in conventional polyurethane foam systems, both parts of the two-part formulation are comprised primarily of organic compounds. In the present invention, however, one of the two parts of the two-part formulations is primarily aqueous in nature, thereby facilitating metering and mixing, facilitating equipment clean-up, moderating reaction exotherm, reducing the fire hazard of the system during the spraying and other processing operations, and permitting the use of very simple and low cost foam fabrication equipment.

Because large amounts of water are in the aqueous reactant during reaction, it is possible to combine a great variety of materials in the aqueous reactant which are otherwise not possible with limited water reacting systems.

The aqueous reactant may contain any desirable amounts of seeds, although it is recognized that other plant reproduction members such as bulbs and the like may also be included. An example of an amount of seeds effectively combined in preparing the present horticultural structures ranges upward from about one to two seeds per cubic inch of foam, which generally corresponds to about 0.001 to about 3 pounds seed per pound of resin to be reacted. Obviously, the seed type, size and plant density all regulate the amount of seed employed in the aqueous reactant. Optionally, the seeds may in certain cases be dispersed in the resin reactant but prior experimentation is recommended to assure that the seeds are not held in contact with the resin for an excessive period of time during which the seeds may be damaged or the resin reactant may become contaminated by moisture.

The present foam structures may be configurated as sheets, tapes, buns, etc., which may be stacked or rolled up and stored for extended periods of time with little or no adverse effects on the seeds and/or pesticides or herbicides contained therein. When ready for use, the sheets can be spread out on the ground, properly staked to hold them in place, and then sprinkled with water and maintained in proper condition for seed germination and plant growth. Optionally, the foam-seed sheets or foam-seed-fabric composites may be pre-germinated prior to application to the soil. In this configuration, the grass will be already growing and the root structure firmly established in the open cells of the foam matrix at the time it is spread out on the ground in its permanent location. In either mode used, root structures thus developed eventually take root in the soil beneath. This is an excellent way, for example, to make and use an "artificial sod," a soil stabilizing ground cover for construction sites, road side embankments, lawn sites, gardens, and the like. The unique hydrophilic nature of the foam combines with the open cell, porous, absorptive structure thereof to give a very beneficial growth medium. Seeds are held in place so they cannot be blown away be the wind and rain erosion or be carried away by birds, vermin and the like.

Large amounts of water soluble or water dispersible materials may be added to the aqueous reactant. These materials may be added to the aqueous reactant up to 800% by weight of the amount of water in the aqueous reactant, depending of course on the particular material and its weight. Useful additives to the aqueous reactant include organic and inorganic fertilizers, soil conditioners, soil bases, conditioners, fungicides, herbicides, insecticides, bactericides, pesticides, fibers, mulch, cellulosics, pigments, dyes, radiation control substances, enzymes, or the like. By homogeneously distributing these materials in the aqueous reactant, it is possible to effect wide distribution of these materials throughout the finally prepared foam. Some or all of the above additives added may also be combined into the resin reactant as desired.

The present foams have great utility for decorative, protective, nutrient and weed retardant surfaces. The feature of water vapor permeability of these foams and sponges resulting from the hydrophilic nature of the polyoxyethylene polyol reactant, renders then especially attractive for horticultural utility. They are also useful as plant potting media; matrices for flower arrangements, cuttings, etc.; root balling media; hydroponics media; etc. Also, the foams can be ground up into small pieces and admixed with soil or earth and the like in order to provide moisture holding capacity, means of soil aeration and resistance to compaction, etc. Because of the ease and simplicity of formulation and foaming procedures, these materials are conveniently suited for use by commercial greenhouse operators, farmers, landscapers, florists, horticulturists and even the do-it-yourself home gardeners and experimentists.

These foams may contail soil, nutrients, and/or fillers for horticultural applications including use as a matrix for plant growth. For this purpose, the present foams are effective for supporting seedlings which may be simply transplanted without root damage.

A wide variety of solid materials may be added to the present foams to produce changes in properties. These solid materials which may be added include for example finely divided carbon particles for retarding light passage while absorbing heat beneficial to growth of the seeds, perlite, sand, soil, earth, urea and the like. Organic fillers including shredded cornstalks, straw, hay, humus, peat moss and the like may be added as desired.

For many applications, especially in those instances where the foam composites of the present invention are in contact with plants or used as ground covers (artificial sod, mulch sheets, seed taper and the like) it is highly desirable that the foamed polymeric material be biodegradable, and thus become absorbed ultimately into the soil without the need for recovery of the foam and disposal by burning or by land fill, etc. It is possible within the scope of this invention to accomplish this objective by proper design of the molecular microstructure of the foam forming polymeric intermediates. For example, the use of relatively low M.W. polyoxethylene polyols (below about 600 M.W.) and partial chain extension of same with the use of polybasic acids to form ester linkages which are responsive to slow hydrolysis in the ambient emvironment and/or the inclusion of groupings easily cleaved by oxidation by the ambient atmosphere, including the rate promoting effect of ultraviolet radiation from the sun. In other instances, chemical agents may be added to deliberately promote biodegradation of the foam structure soon after the foam matrix has served its useful purpose in initiating and maintaining the growth of the seeds or seedlings, etc.

Even in the absence of seeds or seedlings, the foams of this invention can be used for a variety of functional or decorative purposes. In spray form or as pre-formed sheets, the foams for example can be used as an agricultural mulch, i.e., a cover around certain plant crops that serves to keep the soil warm, moist and weed-free during the critical portions of the growing season, especially in arid climactic conditions. Further, these seed-free compositions containing various additives such as pesticides or plant nutrients and the like can be sprayed and foamed-in-place directly onto the plants, bushes, fruit trees and the like or on the soil adjacent thereto to form a durable, functional, breathable, moisture absorptive foam coating that serves a useful purpose over an extended time period during the growing season.

The present hydrophilic horticultural foams may be produced and applied in laminated form, i.e., supported on a porous open mesh scrim such as burlap or other woven or non-woven fabric, paper, paper board, or like substrate. Such supporting substrate networks permit enhanced dimensional stability of the foam structure when very low thicknesses of foam are desired for purposes of economy of coverage of especially large areas.

The following examples will aid in explaining, but should not be deemed as limiting, practice of the present invention. In all cases, unless otherwise noted, all parts and percentages are by weight.

EXAMPLE 1

To a reaction vessel containing 3,092 grams, representing 1 mole, 3 eq. OH, of a triol prepared from potassium hydroxide catalyzed reation of 92 grams anhydrous glycerol with 3300 grams of ethylene oxide, were added 522 grams, representing 3 moles, 6 eq. NCO of tolylene diisocyanate having about 80/20 mixture of 2,4 isomer/2,6 isomer. The reaction exotherm was kept at 70°C. by external cooling with water, while stirring for 4 hours. The actual isocyanate content, determined by titration with standard n-butylamine solution in toluene, remained at the constant level of 0.79 meq. NCO/gram relative to a theoretical content of 0.83 meg. NCO/gram. The resultant pale yellow syrup was found to solidify at about 30°–35°C., and was soluble in toluene, and acetone. The recovered resin had a theoretical molecular weight of about 3615.

A foam was prepared by applying continuously 25 parts of the recovered polyoxyethylene triisocyanate per 25 parts of water containing 1 part of annual Italian rye grass seed using the assembly of FIG. 1. Burlap was used as the substrate. The resultant foam composite had a thickness of about one-fourth inch. The composite was allowed to dry and stand at 25°C., 10–30 percent relative humidity in the dark for one month with no apparent germination of the grass seed. Next, the seed-foam composite was kept moist with 50 ml. water applied every 48 hours. After 6 days of exposure to daylight, grass seed germinated to a uniform green carpet of grass which formed after 12 days.

EXAMPLE 2

The procedure of Example 1 was repeated except the resin was mixed with water containing 0.5 part of green grass (phthalocyanine pigment) color. Corresponding results were realized compared to Example 1. Similar results were obtained also using a water soluble green dye.

EXAMPLE 3

The procedure of Example 1 was repeated except using a modified procedure as follows. To a reaction vessel containing 4,136 grams, representing 1 mole, 4 eq. OH, of a tetrol prepared from sodium methoxide catalyzed reaction of 136 grams pentaerithritol with 4400 grams of ethylene oxide, were added 696 grams of tolylene diisocyanate having about t80/20 mixture of 2,4 isomer/2,6, isomer. The reaction was carried out using the procedure of Example 1. The actual isocyanate content noted was 0.86 meq. NCO/gram relative to a theoretical content of 0.83 meq. NCO/gram. The recovered product was a colorless syrup which solidified at about 35°–40°C., and was soluble in toluene and acetone. The theoretical molecular weight of the resin product is about 4832.

19.2 parts of the recovered capped resin product from this example, were reacted with 20 parts water and spread out in a thin layer. Grass seed was applied to the tacky surface during foaming. The horticultural structure had grass seed adhered to the surface.

EXAMPLE 4

20 parts of the resin reactant prepared in Example 1 was reacted per 50 parts water containing 50 parts of an equal mixture of humus, sand, and vermiculite in suspension. After foaming was completed, seeds were applied to an adhesive disposed on the foam surface. A flexible structure which did not crumble when handled resulted which proved useful in sustaining plant growth.

EXAMPLE 5

The procedure of Example 1 was repeated except in place of the seeds was added a correspondingly amount of a commercially available pesticide. When applied to a control soil surface and watered, the pesticide leached into the soil.

EXAMPLE 6

20 parts of the resin reactant prepared in Example 2 were reacted and foamed with an aqueous reactant having 160 parts water and 80 parts Vermiculite fines.

EXAMPLE 7

One part of the capped polyoxyethylene polyol product mixture from Example 1 was charged into one chamber of a dual nozzle spray gun. One part of tap water containing 0.07 part fine Kentucky bluegrass seeds and 0.05 part nutritional soil was charged in the other chamber. Air pressure was applied to both chambers at 40 to 50 psi.

The resultant co-sprayed product aerosol stream was directed against a burlap surface where after 10 minutes the foam was a tack-free adherent.

EXAMPLE 8

The procedure of Example 7 was repeated except in place of the seeds there was added a commercially available heribicide. A section of the product was placed over a weeded patch of grass and subsequently watered. After several days, the weeds were destroyed along with the grass.

EXAMPLE 9

The procedure of Example 1 was repeated except using a modified resin prepared as follows. A solution of 92 grams glycerol representing 1 mole, 3 eq. OH, and 1000 grams of polyoxyethylene glycol 1000 representing 1 mole, 2 eq. OH was outgassed at 100°C. and 10 Torr for 2 hours. To the outgassed solution was added 870 grams representing 5 moles tolylene diisocyanate having an 80/20 mixture of 2,4 isomer/2,6 isomer. The reaction solution was stirred at 60°C. for 4 hours whereupon the actual isocyanate content reacted a constant 2.49 meq. NCO/gram relative to a theoretical content of 2.54. The resin product had a pale orange color, a density of 1.10, and a viscosity (Brookfield No. 4 spindly) at 25°C. of 13,400 cps. The actual NCO content of this resin product was 2.49 meq. NCO/gram relative to a theoretical content of 2.54 meq. NCO/gram.

EXAMPLE 10

The procedure of Example 9 was repeated except using polyoxyethylene glycol having a weight average molecular weight of 4,000.

EXAMPLE 11

The procedure of Example 1 was repeated except using a resin prepared as follows. 630 grams of polyoxyethylene glycol representing 1 mole was reacted as described in the procedure of Example 1 with 2.1 grams diethylene triamine (DETA) and 348 grams (2 moles) of 80/20 ratio of 2,4/2,6 tolylene diisocyanate.

EXAMPLE 12

The procedure of Example 1 was repeated except using a resin prepared by capping a polyoxyethylene diol with a polyisocyanate having a functionality greater than 2, to give polyisocyanate foams with higher crosslink density and superior physical properties, lower solubility, and greater hydrolytic stability than foams from polyoxyethyland diisocyanates. Thus a 1000 grams portion, 0.25 eq. OH, of polyoxyethylene glycol of 4000 weight average molecular weight was outgassed at 110°C. and 10 Torr for 2 hours. Next, to this outgassed liquid was added at 60°C. 200 grams, 0.5 moles, NCO, of polymethylene polyphenylisocyanate commercially available under the name PAPI by Upjohn Co. This latter material has nearly three isocyanate groups per molecule and an isocyanate equivalent weight of 133. A corresponding result was realized.

EXAMPLE 13

The procedure of Example 1 was repeated except using a resin prepared as comonomers mixtures using of 75% ethylene oxide and 25% propylene oxide to form the triol, along with methylene dicyclohexyl diisocyanate to form a triisocyanate. A mixture of 13.4 grams, 0.1 mole of trimethylolpropane and 0.6 grams. 0.01 mole of potassium hydroxide was stirred at 100°-180°C. in the presence of 250 grams of ethylene oxide at 20 to 100 psi. After 3 hours the reaction pressure dropped to one atmosphere. To the reaction product syrup was then added 250 grams of propylene oxide with stirring at 100° to 180°C., and a pressure of 20 to 75 psi for 4 hours whereupon the reaction pressure at 100°C. dropped to one atmosphere. To this reaction product syrup having a brown color was added 500 grams of ethylene oxide. The reaction was stirred at 100°-180°C. for 12 hours whereupon the reaction pressure dropped to one atmosphere at 100°C. The resultant brown oil was stripped of volatiles at 50° to 100°C. at 10 Torr resulting with 978 grams of brown syrup having a hydroxyl content of 0.32 meq. OH/gram relative to 0.31 meq./gram theory.

To 931 grams, 0.30 OH, of the prepared copolymer triol containing 1.0 g. stannous octoate catalyst was added 88.0 grams, 0.32 moles, of dicyclohexylmethane diisocyanate. The solution stirred at 60°C. for 8 hours whereupon the NCO content of the polymer reached a constant 0.33 meq./gram relative to 0.32 theory. The triisocyanate product was characterized as a light amber syrup having a viscosity of 12,000 cps. at 25°C. (Brookfield) and was used to make a composite seed-foam-fabric structure by the method of Example 1.

EXAMPLE 14

The procedure of Example 1 was repeated using 30.9 parts triol mixed with 5.5 parts of diisocyanate, 0.1 part L520 silicone surfactant by Union Carbide, and 0.05 part dibutyl tin dilaurate plus 0.05 part N-methyl diethanol amine. To this mixture was added immediately 100 parts slurry of water. Seed was applied after foaming using adhesive on one side while burlap was adhesively secured on the opposite side. Corresponding results were realized.

EXAMPLE 15

A slurry of 100 grams of pentaerythritol, 0.735 moles having 2.94 eq. OH in 860 grams of tolylene diisocyanate, 4.95 moles having 9.9 eq. NCO groups/gram and a ratio 80/20 of 2,4 isomer/2,6 isomer was stirred for 24 hours. An orange solution resulted. To the orange solution was added 1000 grams outgassed polyoxyethylene glycol representing 1 mole having 2.0 eq. OH. These reactants were stirred about 67°C. for 4 hours followed by additional stirring at 25°C. for 16 hours whereupon the isocyanate content reached a constant level of 2.63 meq. NCO groups/gram relative to theoretical value of 2.56 meq. NCO groups/gram. The resultant product had an orange color, and a viscous syrup consistency at 25°C. The NCO content of the mixture was 2.63 meq. NCO groups/gram actual, relative to 2.56 meq. NCO groups/gram, theory.

This resin product was foamed using the procedure of Example 1.

EXAMPLE 16

To 1030 grams, representing 1 eq OH, of a triol prepared from 92 grams, 1 mole, glycerol and 3030 grams ethylene oxide, and 1.1 g. stannous octoate catalyst were added 168, 1 mole of 1,6-diisocyanatohexane. The reaction solution was stirred at 60°C. to 70°C. for 6 hours whereupon the isocyanate content of the resin product reached a constant of 0.827 meq. NCO/g relative to a theoretical value of 0.835. The resultant pale yellow product syrup solidified to a waxy solid at 35° to 40°C. This resin product was foamed using the procedure of Example 1 using 25 pts of the resin and 25 pts water containing 3 parts of a nonionic surfactant Wyandates Plurofac B-26 (an ethoxylated straight chain aliphatic alcohol) and 1 part of a commercially available Scotts "Windsor" (a trade marked product by Scotts, the lawn people who have everthing for a greener, thicker lawn) seed mixture. Corresponding growth was realized except the grass was greener and thicker.

Although the present invention has been defined with special reference to horticultural structures, it will be appreciated that the invention is readily applicable to agricultural usage generally. For example, these structures have effective application as mulch, root balling, roll-out seed tapes prepared such as by foaming a strip onto spaced seeds, spray application to roots during transplant, spray application onto ground surfaces, layering a pre-formed sheet onto ground surfaces especially for errosion control and the like. The present structures may contain soils, seeds, plants, nutriants, fertilizers, pesticides, dyes, inorganic and organic fillers, and the like.

It is understood that the foregoing detailed description is given merely by way of illustration and that many variations may be made therein without departing from the spirit of this invention.

What is claimed is:

1. A method for preparing improved crosslinked hydrophilic foam structure said method comprising reacting as a continuous sheet, a first component comprising isocyanate capped polyoxyethylene polyol having a reaction functionality greater than two, with a second component comprising aqueous reactant in the presence of a horticultural material, the ratio of moles $H_2O$/moles NCO groups being about 6.5 to about 390 in said second and first components respectively.

2. The method of claim 1 wherein the capped polyoxyethylene polyol is present in the first component in an amount from about 3% by weight up to 100% by weight, and wherein a capped polyoxyethylene polyol having a terminal member with an isocyanate functionality of two is present in an amount from 0% up to about 97% by weight.

3. The method of claim 2 wherein a biodegradable fabric is disposed continuously onto the continuous sheet of foam.

4. The method of claim 1 wherein the polyoxyethylene polyol moiety of the isocyanate capped member has a weight average molecular weight of about 200 to about 20,000, and a hydroxyl functionality of about 2 to about 8.

5. The method of claim 4 wherein the weight average molecular weight is about 600 to about 6,000.

6. The method of claim 1 wherein the ratio of moles $H_2O$/moles NCO groups is from about 1 to about 200.

7. The method of claim 1 wherein a biodegradable fabric is disposed on one side of the foam sheet.

8. The method of claim 1 wherein a fabric is disposed along one side of the continuous sheet, said fabric being selected from the group consisting of paper, plastic and cloth.

9. The method of claim 1 wherein the horticultural material comprises seeds disposed within the continuous sheet.

10. The method of claim 1 wherein the horticultural material comprises seeds adhesively secured onto the continuous sheet of foam.

11. A method for preparing improved crosslinked hydrophilic foam structure, said method comprising reacting as a continuous sheet, first component comprising isocyanate capped polyoxyethylene polyol having a reaction functionality equal to about two with a second component comprising aqueous reactant, and a third component comprising a crosslinked agent having a reaction functionality greater than two, the ratio of moles $H_2O$/moles NCO groups being about 6.5 to about 390 in said second and first components respectively, the reaction being effected in the presence of a horticultural material.

12. The method of claim 11 wherein the crosslinking agent of the third component is a polyol.

13. The method of claim 11 wherein the crosslinking agent of the third component is a polythiol.

14. The method of claim 11 wherein the crosslinking agent of the third component is a polyisocyanate.

15. The method of claim 11 wherein the crosslinking agent of the third component is a polyamine.

16. The method of claim 11 wherein the polyoxyethylene polyol moiety of the isocyanate capped member has an average molecular weight of about 200 to about 20,000, and a hydroxyl functionality of about 2 to about 8.

17. The method of claim 11 wherein the weight average molecular weight is about 600 to 6,000.

18. The method of claim 11 wherein the ratio of moles $H_2O$/moles NCO groups is from about 20 to about 200.

19. The method of claim 11 wherein a fabric is disposed continuously onto one side of the foam sheet, said fabric being selected from the group consisting of paper, plastic and cloth.

20. The method of claim 11 wherein the horticultural material is seeds adhering to the surface of the foam support layer.

21. The method of claim 11 wherein the horticultural material comprises seeds disposed within the foam.

* * * * *